United States Patent [19]
Müller et al.

[11] Patent Number: 5,700,566
[45] Date of Patent: Dec. 23, 1997

[54] HEAT RESISTANT COMPOSITE LAMINATE

[75] Inventors: Michael Müller, Bensheim; Volker Benz, Höchst; Uwe Numrich, Weiterstadt; Horst Pühler, Mühltal; Wilhelm Wopker, Bickenbach, all of Germany

[73] Assignee: Roehm GmbH Chemische Fabrik, Darmstadt, Germany

[21] Appl. No.: 540,766

[22] Filed: Oct. 11, 1995

[30] Foreign Application Priority Data

Oct. 12, 1994 [DE] Germany .................. 44 36 381.8

[51] Int. Cl.⁶ .................... B32B 27/08; A47K 3/02
[52] U.S. Cl. .................... 428/332; 428/518; 428/520; 428/357; 428/365; 4/538
[58] Field of Search .................... 428/332, 518, 428/520, 357, 365; 4/538

[56] References Cited

U.S. PATENT DOCUMENTS

| 4,844,944 | 7/1989 | Graefe et al. | 428/357 |
| 5,019,448 | 5/1991 | Kleosch et al. | 428/332 |

FOREIGN PATENT DOCUMENTS

| 0 223 250 | 5/1987 | European Pat. Off. . |
| 0 266 107 | 5/1988 | European Pat. Off. . |
| 0 401 150 | 12/1990 | European Pat. Off. . |
| 0 589 343 | 3/1994 | European Pat. Off. . |
| 2 000 159 | 7/1970 | Germany . |

*Primary Examiner*—Richard Weisberger
*Attorney, Agent, or Firm*—Oblon, Spivak, McClelland, Maier & Neustadt, P.C.

[57] ABSTRACT

The invention relates to composites VS comprising at least two plastic layers A and C, suitable for the production of articles which, on one surface, come into contact with water at temperatures between 0° and 90° C., wherein the layer A, which comes into contact with water, comprises a thermoplastic, impact-resistant polymethyl methacrylate plastic SP having a Vicat softening temperature of at least 95° C. according to ISO 306 procedure B and a notch impact resistance of at least 3.0 kJm$^{-2}$ according to ISO 180 1A, and layer C comprises an impact-resistant acrylonitrile-styrene copolymer VP. In a preferred specific embodiment of the invention, another layer B, made of a thermoplastic polymethyl methacrylate plastic P, is placed between layers A and C.

19 Claims, No Drawings

HEAT RESISTANT COMPOSITE LAMINATE

BACKGROUND OF THE INVENTION

1. Field of the Invention

The invention relates to a composite comprising at least two plastic layers A and C, suitable for the production of sanitary articles that come into contact on a surface with water, which can have a temperature of up to 90° C., wherein layer A, which comes into a contact with water and is found on the carrier layer C, comprises an impact-resistant, thermoplastic polymethyl methacrylate plastic SP, having a Vicat softening temperature VET according to ISO 306 procedure B of at least 95° C. and a notched bar impact value KSZ, according to ISO 180 1A, of at least 3.0 kJm$^{-2}$, and wherein the carrier layer C comprises a thermoplastic, impact-resistant acrylonitrile-styrene polymer VP. Preferably, another carrier B, synthesized from a polymethyl methacrylate P, is found between layers A and C.

2. Discussion of the Background

Composites consisting of various plastic layers, containing polymethyl methacrylate layers and, respectively, their use for sanitary articles are known.

Thus, U.S. Pat. No. 4,053,545 describes a method for the production of sanitary articles in which a plate made of thermoplastic, preferably a polymethyl methacrylate produced from a cast resin, is brought into the form of a sanitary article by thermal shaping, and is deposited with a foam layer made of a thermoplastic, which was produced in the injection molding process. The adhesion of the composite made of polymethyl methacrylate and foam is improved by adhesives.

EP A 589,343 describes a method for the production of three-dimensionally shaped, trough- and bowl-like articles made of several plastic layers, with a concave foam side, wherein on the convex side of the layer made of polymethyl methacrylate, a reinforcing layer of a reactive isocyanate resin is applied, which is cured to a rigid polyurethane plastic. It is characteristic that the convex side of the layer made of polymethyl methacrylate is coated with a solution of an essentially uncrosslinked polymer resin with a strong crystallization tendency and with urethane, ester, and/or hydroxy groups.

EP A 266,107 describes molded articles with a decorative surface consisting of an injection-molded polymer substrate and a plate or film material for the decorative surface, wherein the plate or film material consists of an extensively unoriented, weather-stable polymer material, which contains homogeneously distributed dye pigments. In accordance with the description, the film material preferably consists of polymethacrylate plastics, which can be modified to be impact resistant, whereas the polymer substrate preferably consists of a polymer that has good injection molding properties and is cheap.

EP A 454,520 describes a method for the production of a film of a composite material, with a plate made of polymethyl methacrylate, which makes up the external layer of the composite material, and a supporting layer made of a thermoplastic material, for example, acrylonitrile-butadiene-styrene (ABS) terpolymer, wherein with reference to obtaining a complete cohesion and combination of the two layers with one another, different process parameters must be observed.

DE-OS 2,000,159 reports sanitary articles which consist of, at least partially, a core of foamed thermoplastic material and unfoamed surface coatings made of polymethyl methacrylate. The described sanitary articles are preferably produced in a two-stage injection molding process. The surface coating made of polymethyl methacrylate can, in turn, contain dye pigments.

U.S. Pat. No. 4,844,944 describes multilayer plastic composites with a high impact resistance and low delamination tendency wherein a polymeric cover layer is chemically bound to a substrate layer, which consists of a crosslinked isocyanate-modified polyester or polyether resin. The cover layer consists of a thermoplastic polymer, for example, of polymethyl methacrylate, and can contain dye pigments, fillers, or other additives. Such multilayer composites can be used for sanitary articles.

DE-OS 3,128,985 describes laminates on a polymethyl methacrylate base, which have, in addition to a polymethyl methacrylate layer, at least one polymethyl methacrylate layer with high impact resistance also. This reference refers to shaped objects, which are produced from these laminates, such as sanitary articles and plates for the installation objects. In the production of such laminates, a polymethyl methacrylate layer is preferably extruded as a plate, wherein immediately after calendering of the polymethyl methacrylate layer, a polymethyl methacrylate layer with a high impact resistance is applied as a film. Also preferred, the layer made of polymethyl methacrylate with a high impact resistance is the carrier or substrate for the layer made of polymethyl methacrylate.

The composite systems comprised by the state of the art have surface layers made of polymethyl methacrylate, which exhibit increased fissure formation with frequent contact with water, particularly, at temperatures above 60° C. This is equally-true for high molecular polymethyl methacrylate cast resins and for thermoplastically processable, polymethyl methacrylate, shaped compositions, and makes such polymers only conditionally useful for use in sanitary materials, such as, in particular, bathtubs, washbasins or sinks.

Slightly more useful for such sanitary objects frequently filtered with hot water are coatings made of impact-resistant polymethyl methacrylates, as are described, for example, in DE-OS 3,128,985. However, DE-OS 3,128,985 preferably uses the impact-resistant polymethyacrylates as carrier layers, wherein composite systems result, in which the unmodified polymethacrylate appears as a surface layer that comes into contact with water.

The task resulting therefrom consists in making available composite systems made of plastics for sanitary materials whose surface layer can stand frequent contact with water, particularly at temperatures above 60° C., without the formation of fissures, and which also have a high impact resistance.

SUMMARY OF THE INVENTION

Surprisingly, it was discovered that composites VS, comprising at least two plastic layers A and C, resolve this task in an excellent manner, if the layer A, which comes into contact with water, is made of a thermoplastic, impact-resistant polymethyl methacrylate plastic SP, and the carrier layer C, which lies underneath, is made of a thermoplastic, impact-resistant plastic VP, wherein the impact-resistant polymethyl methacrylate plastic SP, has a Vicat softening temperature (VST) according to ISO 306 procedure B of at least 95° C. and an impact resistance according to ISO 180 IA of at least 3.0 kJm$^{-2}$, and layer C is made up of an impact-resistant acrylonitrile-styrene copolymer VP.

Preferred are composites VS, further comprising an additional carrier layer B, made of a thermoplastic polymethyl methacrylate plastic P, placed between layer A, which comes into contact with water, and carrier layer C. The layers A, B, and C can each contain 0.1 to 10 wt % dye and/or pigment, based on the weight of the individual layer.

Also preferred are composites VS, further comprising a reinforcing layer D, made of a curable and perhaps foamable cast resin, placed on a side of layer C, opposite the carrier layer B. Particularly preferred, is a reinforcing layer D containing 5 to 40 wt %, based on the curable cast resin UP, of a filler, such as minerals or fibrous substances, in particular glass fibers.

In another preferred specific embodiment of the invention, the thickness of layer A is between 0.2 and 5 mm; of layer B, between 0.5 and 20 mm; of layer C, between 0.5 and 20 mm; and of layer D, between 3 and 20 mm.

The composite VS comprising layers A and C or A, B, and C are preferably produced by co-extrusion, whereas layer D can be applied, for example, by reaction injection molding on the composite made of A and C or A, B, and C.

The composites VS, in accordance with the invention and comprising layers A and C, or A, B, and C, can be processed by thermal shaping, such as deep drawing, to form the desired sanitary articles, without producing changes with regard to the characteristics of the layer A, which comes into contact with water.

DETAILED DESCRIPTION OF THE PREFERRED EMBODIMENTS

The polymethyl methacrylate plastics P, which are used for the optional carrier layer B, comprises 80 to 100 wt % methyl methacrylate and 0 to 20 wt % monomers that can be copolymerized with it, such as $C_{1-4}$ alkyl acrylates, vinyl aromatics, such as styrene or α-methylstyrene or (methy) acrylonitrile. The weight average molecular weight (Mw) of polymer P is between $10^4$ and $10^6$, preferably between $3 \times 10^4$ and $5 \times 10^5$ daltons (for the determination of Mw by gel permeation chromatography or by the light-scattering method; see, for example, H. F. Mark et al., Encyclopedia of Polymer Science and Engineering, 2nd Ed., Vol. 10, pp. 1 ff, J. Wiley, 1989). Polymethyl methacrylate plastics P can pe prepared by conventional methods known to those of ordinary skill in the art. Polymers P can be extruded and injection-molded well, wherein with both processing techniques, temperatures above 300° C. should be avoided.

The thermoplastic, impact-resistant polymethyl methacrylate plastic SP, which is used for the layer A, which come into contact with water, is generally a two- or multi-stage emulsion polymer EP, wherein the outer shell, comprises polymethyl methacrylate plastic HP, such as the aforementioned polymethyl methacrylate plastic P, and the core comprises a rubber GP made of crosslinked polyacrylate. Preferred are emulsion polymers with an at least three-stage structure, that is, those latex particles which in the rubber GP made of crosslinked polyacrylate also exhibit a hard polymer core, preferably made of polymethyl methacrylate HP. The fraction of the emulsion polymers EP on the impact-resistant polymethyl methacrylate plastics SP lies between 1 and 80 wt %, preferably between 5 and 70 wt %, based on SP, wherein the remaining weight fractions are made of the polymethyl methacrylate plastic P, which is not connected covalently with the latex particles.

The polymer of the outer shell HP is compatible with the polymethyl methacrylate plastic P, preferably the polymer of the outer shell HP is miscible with the polymethyl methacrylate plastic P, and more preferably the polymer of the outer shell HP is the same as the polymethyl methacrylate plastic P.

Preparation of a suitable impact-resistant polymethyl methacrylate can be achieved by conventional methods known to those of ordinary skill in the art. Preferably, the impact-resistant polymethyl methacrylate plastics SP are prepared by recipes of emulsion polymers EP with polymethyl methacrylate plastics P, wherein, for example, the emulsions of EP and P are mixed and subsequently, the water phase and the emulsifiers are separated or wherein first the emulsion polymer EP is isolated from the aqueous phase, and subsequently is mixed with the polymethyl methacrylate plastic P in the melt.

As a whole, the latex particles, which form the emulsion polymer EP, should preferably exhibit a diameter between 0.1 and 3 μm, more preferably between 0.15 and 1 μm (with embedded hard core). In principle, the structure of such latex particles and the isolation of the polymer EP are described, for example, in EP A 113,924 (U.S. Pat. No. 4,513,118).

Appropriately, the work in the emulsion polymerization carried out in the aqueous phase is done in the neutral or slightly acidic pH range, wherein the use of long-chain alkyl sulfates or alkyl sulfonates as emulsifiers is favorable. Suitable polymerization initiators include known azo compounds or organic or inorganic peroxides, such as persulfates, are suitably used as polymerization initiators. In general, the content of initiators lies in the range between $10^{-3}$ and 1 wt % based on the weight of monomers. Preferably, the polyacrylate rubber GP consists of the monomers ethyl acrylate, 2-ethylhexyl acrylate, aralkoxy acrylates, and, particularly preferably, of butyl acrylate, wherein, in general, crosslinking monomers with at least two radically polymerizable, ethylenically unsaturated groups, such as allyl methacrylate, ethylene glycol dimethacrylate or triallyl cyanurate, are also present in quantities of 0.1 to 5 wt %, based on the monomers. Allyl methacrylate and triallyl cyanurate act as graft crosslinking agents, which link the outer shell of the elastomeric particles made of polymer covalently at least to some extent, with the rubber phase GP, that is, by more than 5 wt % based on HP.

In a preferred embodiment the impact-resistant polymethyl methacrylate plastic has a Vicat softening temperature of at least 100° C. according to ISO 306 procedure B.

In a preferred embodiment the impact-resistant polymethyl methacrylate plastic has a notch impact resistance of at least 4.0 kJm$^{-2}$, more preferably at least 5.0 kJm$^{-2}$, according to ISO 180 1A.

The impact-resistant polymethacrylate plastics SP are thermoplastic and, in general, are extruded or injection-molded, like the polymers P, wherein, processing temperatures above 300° C. should be avoided.

The carrier layer C is made up of styrene-acrylonitrile (SAN) polymers VP which are modified for impact resistance, such as preferably of acrylonitrile-butadiene-styrene terpolymers (ABS: see in this regard, for example, Kirk-Othmer, Encyclopedia of Chemical Technology, 3rd Ed., Vol. 1, pp. 442–456, J. Wiley, New York, 1978). Suitable impact resistant acrylonitrile-styrene copolymers can be prepared by conventional methods known to those of ordinary skill in the art. It is characteristic that the SAN hard phase is compatible with the polymethyl methacrylate P of the carrier layer B and thus an excellent adhesion is ensured between layers A and C or B and C.

In general, the impact resistances of the ABS polymers clearly lie above those of the impact-resistant polymethacrylates SP, which make up layer A, which leads to a clear increase in the impact resistance of the entire composite. The placement of layer C below layer A or carrier layer B is necessary, as styrene-acrylonitrile copolymers that are modified to be impact-resistant exhibit, among other things, a low stability to light and a low stability with respect to thermal oxidative burdens and thus are unsuitable for use in a surface (layer A) that comes into contact with water.

The plastics UP that make up the reinforcing layer D are preferably polyurethane plastics (see, for example, Kirk-Othmer, Encyclopedia of Chemical Technology, 3rd Ed., Vol. 23, pp. 576–608, J. Wiley, New York, 1983) or resins from unsaturated polyesters (see, for example, Kirk-Othmer, loc. cit., Vol. 18, pp. 575–594, J. Wiley, New York, 1982). Polyurethane plastics UP, in general, contain at least one polyol, preferably a polyesterpolyol, and at least one di- or multifunctional isocyanate, which reacts with the polyol, with the formation of a polymer matrix, which is perhaps crosslinked, and perhaps curing catalysts and other additives. It is essential that the mixture be cured to a rigid polyurethane-plastic UP that is not very elastic at room temperature. If water or propellants are also to be used as additives, a more or less strongly foamed polyurethane-plastic layer D is formed. Suitable blowing agents are conventionally known to those of ordinary skill in the art, and can be selected based on the specific composition of the polyurethane. Its density is preferably in the range between 200 to 1,000 kgm$^{-3}$. Furthermore, the polyurethane-plastic UP can contain fillers, such as minerals or fibrous substances, for example, glass fibers, in a quantity of preferably 5 to 40 wt % based on the total layer D. The adhesion between layer C and layer D can be improved by suitable adhesives. Suitable polyurethane plastics can be prepared by conventional methods known to those of ordinary skill in the art.

In another specific embodiment of the invention, the layer can comprise resin formulations UP of unsaturated polyesters and monomeric styrene, which are generally polymerized with the aid of radical polymerization initiators to form polyester resins UP. An indispensable condition for the use of such polyester resins UP, however, is the presence of layer C made of impact-resistant styrene-acrylonitrile copolymer VP, which, in contrast to the polymethyl methacrylate P in layer B, is not attacked by the monomeric components of the polyester resin UP. Suitable unsaturated polyesters can be prepared by conventional methods known to those of ordinary skill in the art.

Just as the polyurethane plastic, the polyester resin can contain fillers, such as minerals or fibrous substances, for example, glass fibers, in a quantity of, for example, 5 to 40 wt % based on the total layer D.

Production of the Composites VS

The composite VS comprising layer A, comprising the impact-resistant polymethyl methacrylate plastic SP, optional layer B, comprising the polymethyl methacrylate plastic P, and C, comprising the impact-resistance styrene-acrylonitrile copolymer VP, are preferably produced by coextrusion according to conventional methods of two-layer or three-layer coextrusion.

Methods of two-layer or three-layer coextrusion are, for example, described in EP A 418,681 (U.S. Pat. No. 5,066,435) and EP A 484,797 for two-layer coextrusion or in DE A 3,244,953 (U.S. Pat. No. 4,707,393) and DE A 3,312,611 (U.S. Pat. No. 4,576,870) for three-layer coextrusion. The layer thicknesses thereby advantageously produced lie between 0.2 and 5 mm, preferably between 0.5 and 3 mm, for layer A, between 0.5 and 20 mm, preferably between i and 10 mm, for layer B, and between 0.5 and 20 mm, preferably between 1 and 10 mm, for layer C.

In the processing of the thermoplastic polymethyl methacrylate plastic P and SP, one should be careful that the temperature in the extruder remain below 300° C. in order to avoid a decomposition phenomena with plastics P and SP.

In another specific embodiment of the invention, layer A can be applied by lamination as a film on layer C, which, for example, is produced by extrusion, or on the composite of layers B and C, which are each produced by coextrusion as described in DE A 3,128,985. The required lamination temperature is thereby produced by corresponding heating units or corresponds to the surface temperature of the layer C or B, leaving the extruder, at the point where layer A is laminated.

Composites VS are preferably coated with the reinforcement layer D after the composites consisting of layers A and C or A, B, and C have been heated to the thermoplastic state, shaped three-dimensionally, for example, by means of positive or negative form tools, and by cooling below the softening temperature, fixed in their final form, which can comprise, for example, sanitary articles such as bathtubs, douche bowls, sinks, or washbasins. The required thickness of the reinforcing layer D depends on the size and shape of the three-dimensionally shaped body. For bathtubs, a layer thickness of 4 to 20 mm is suitable; for douche bowls and bodies of comparable size and loading capacity, a 3 to 10 mm layer thickness is often sufficient.

The three-dimmensionally shaped body will preferably have concave surfaces and corresponding convex surfaces, with an exterior surface of layer A being exposed on a concave surface.

The resin mixture of polyol, polyisocyanate, and perhaps additives, which forms the polyurethane plastic, or in general, the curable resin mixture UP in the cured state, is preferably applied by means of a two-component mixing nozzle on layer C, which is generally situated on the convex side of the tub- or bowl-shaped body, wherein a very rapid curing occurs.

Composites VS in accordance with the invention exhibit a high impact resistance, which is influenced by layer A, made of impact-resistant polymethyl methacrylate plastic SP, and by layer C, made of impact-resistant acrylonitrile-styrene copolymer VP, and perhaps by layer D, made of polyurethane resin UP. Influenced by the compatibility between polymethyl methacrylate and the styrene-acrylonitrile hard phase of the copolymers VP, there is an excellent adhesion between layer A and C or B and C, which contributes decisively to the high impact resistance of composites VS.

Layer A, which is made of plastic SP and comes into contact with water, exhibits an excellent resistance in the hot water replacement test HWWT according to DIN EN 263, which is described below, with a simultaneous excellent adhesion on layer C, made of styrene-acrylonitrile (SAN) copolymer that is modified for impact resistance or on layer B, made of polymethyl methacrylate plastic P. The tendency to form fissures in layer A with a frequent contact with water at temperatures of, in particular, above 60° C. is clearly reduced in comparison to the composite systems of the state of the art. One should therefore stress that the fissures, once they have formed in layer A, quickly propagate into the underlying layers.

By the good incorporation capacity of dye pigments, of UV absorbers and/or of soluble dyes into layer A, B, and C, light-resistant sanitary articles are possible in almost all colorings if the dye pigments and/or the dyes are light-resistant. Generally, layers A, B, and/or C contain 0.1 to 10 wt % dye, UV absorber, and/or dye pigment, based on the polymer SP, P, and/or VP.

Composites VS, made of layers A and C or A, B, and C, are produced easily, for example, by coextrusion, and exhibit an excellent thermal shapeability, for example, in the deep-drawing process. Thus, sanitary articles with complex shapes are also accessible.

Having generally described this invention, a further understanding can be obtained by reference to certain specific examples which are provided herein for purposes of illustration only and are not intended to be limiting unless otherwise specified.

The following measurements were carried out on composites VS or on individual layers:

1. Vicat softening temperature VST of the polymethyl methacrylate SP, which makes up layer A, according to ISO 306 procedure B;

2. notch impact resistance of the polymethyl methacrylate SP, which makes up layer A, according to ISO 180 1A;

3. hot water replacement test HWWT according to DIN EN 263 ("Specification of cast acrylic plates for base troughs and shower tubs for home use").

A right-angle specimen with a (100±2)-mm edge length and a thickness corresponding to the thickness of the composites is immersed in approximately 2 L boiling water. For eight hours, the specimen remains in the water while it cools to room temperature. The specimen is then taken out of water; the surface is wiped with a moist cloth; and the specimen is placed in an oven at 50°±2° C. for 16 h for further drying. This cycle is repeated on the same specimen.

After a certain number of repetitions, the specimen is placed in a solution of 200 g eosin in 1 L water, to which is added 1 cm³/L liquid wetting agent, for 48 h at 50°±2° C. Then, the specimen is taken out of the solution, and the eosin is removed from the surface of the specimen with a moist cloth.

Disadvantageous changes in appearance (bubbles, breaks, fissures, etc.) must be recognizable with the naked eye and are indicated by traces of the remaining eosin.

4. Stability with respect to household chemicals in accordance with DIN EN 263:

Resistance with respect to the following agents is tested. The quantities indicated in c) to m) are based on 100% pure substance. Each solution is produced immediately before application. All reagents are prepared and used at 23°±2° C.):

a) commercial phenolic disinfectant (9.5 g/L in water);
b) bleaching agent (=5 wt % free chlorine);
c) vinegar (6 vol % glacial acetic acid in water);
d) alcohol (30 vol % ethanol in water);
e) ammonia (50 vol % saturated ammonia solution in water);
f) sodium hydroxide (saturated solution of sodium hydroxide);
g) salt (saturated solution of sodium chloride in water);
h) washing soda (saturated solution of sodium carbonate in water);
i) citric acid (100 g/L in water);
j) hydrochloric acid (10 vol % saturated hydrochloric acid in water);
k) hydrogen superoxide (sic; peroxide) (10 vol % saturated solution of hydrogen superoxide in water); (Note: a watchglass is not necessary for this reagent.);
l) methylene blue (10 g/L in water);
m) potassium permanganate (10 g/L in water).

EXAMPLES

Example 1

Production of a three-layer composite VS1

By means of three-layer extrusion, a strip consisting of three layers A1, B1, and C1, with a width of 400 mm and a total thickness of 5 mm, is produced. The following machine configurations and machine parameters are used in the coextrusion:

for later A1:
single-screw extruder with screw diameter D=25 mm, L/D=32, speed 87 mm$^{-1}$, degassing zone temperature=240° C.;

for layer B1:
single-screw extruder with screw diameter D=35 mm, L/D=32, speed 75 min$^{-1}$, degassing zone temperature 240° C.;

for layer C1:
single-screw extruder with screw diameter D=60 mm, L/D=32, speed 25 min$^{-1}$, degassing zone temperature=240° C.; and a three-layer adapter for the combination of three layers with similar thickness, a plate nozzle with a width of 440 mm, and a three-roll calender with a lying roll arrangement (roll diameter 160 mm; roll temperatures between 75° and 80° C.).

The polymers used for the layers A1, B1, and C1:

1. Layer A1 made of impact-resistant polymethyl methacrylate SP1:

Layer A1 consists of impact resistant-modified polymethyl methacrylate PLEXIGLAS® Y7H of Röhm GmbH with 15 wt % polybutyl acrylate SP1, obtained by recipes of 64 wt % polymethyl methacrylate PLEXIGLAS® Y7H with 36 wt % of a core-shell-shell emulsion copolymer EP1 of the composition 20 parts by weight crosslinked polymethyl methacrylate-core; 44 parts by weight crosslinked polybutyl acrylate-co-styrene, which has the same refractive index as polymethyl methacrylate, as the first shell, and 36 parts by weight polymethyl methacrylate as the second shell (for the production of EP 1, see EP A 113,924). The Vicar softening temperature VET of SP 1 is 100° C.; the notch impact resistance KSZ, 5.0 kJm$^{-2}$.

2. Layer B1, made of polymethyl methacrylate P1:

Layer B1 consists of 98.5 wt % polymethyl methacrylate PLEXIGLAS® Y7H of Röhm GmbH and 1.5 wt % titanium dioxide pigment of the Sachtleben company.

3. Layer C1, made of impact-resistant styrene-acrylonitrile copolymer VP1:

Layer C1 consists of acrylonitrile-butadiene-styrene terpolymer MAGNUM® 555-27-7 of the Dow Chemical Company.

The resulting three-layer composite VSI has the following structure and thickness distribution of the layers:
layer A1, made of SP1: 1 mm: upper layer, which comes into contact with water;
layer B1, made of P1: 1.5 mm: middle carrier layer;
layer C1, made of VPI: 2.5 mm: lower carrier layer.

The layers A1 and B1 or B1 and C1 exhibit an excellent adhesion with one another.

Example 2

Production of a two-layer composite VS2

By means of two-layer coextrusion, a strip of two layers A2 and C2 is produced with a width of 400 mm and a total thickness of 5 mm.

The following machine configuration and machine parameters are used in the coextrusion:

for layer A2:

single-screw extruder with screw diameter D=35 mm, L/D=32, speed 90 min$^{-1}$, degassing temperature=240° C.;

for layer C2:

single-screw extruder with screw diameter D=60 mm, L/D=32, speed 35 min$^{-1}$, degassing temperature=240° C.; and a two-layer adapter for the combination of two layers of similar thickness, a plate nozzle with a width of 440 mm and a three-roll calender according to Example 1.

The polymers used for the layers A2 and C2:

1. Layer A2, made of impact-resistant polymethyl methacrylate SP1:

Layer A2 consists of impact-resistant-modified polymethyl methacrylate PLEXIGLAS® Y7H of Röhm GmbH with 15 wt % polybutyl acrylate viscous phases, according to Example 1.

2. Layer C2, made of impact-resistant styrene-acrylonitrile copolymer VP1:

Layer C2 consists of acrylonitrile-butadiene-styrene terpolymer, according to Example 1.

The resulting two-layer composite VS2 has the following softening structure and thickness distribution of the layer:

layer A2, made of SP1: 1.5 mm: upper layer, which comes into contact with water;

layer C2, made of VP1: 3.5 mm: lower carrier layer.

The layers A2 and C2 exhibit an excellent adhesion with each another.

Example 3

HWWT in accordance with DIN EN 263 with VS1 and VS2

The composites VS1 and VS2, obtained according to Examples 1 and 2, are subjected to the hot water replacement test HWWT according to DIN EN 263, wherein the specimens are cut from the extruded strips, and wherein the layers A1 and A2 were investigated for changes. In comparison, a 5-mm-thick extruded plate made of 98.5 wt % PLEXIGLAS® Y7H from Röhm GmbH and 1.5 wt % titanium dioxide pigment from the Sachtleben Company (polymer P1 according to Example 1) was also tested.

| Material | Cycles until fissure formation |
| --- | --- |
| VS1 | 440 |
| VS2 | 410 |
| P1 | 5 |

Example 4

Testing of chemical resistance in accordance with DIN EN 263 with VS1 and VS2

The composites VS1 and VS2, obtained according to Examples 1 and 2 are subjected to a test for chemical resistance according to DIN EN 263 by the application of the corresponding reagents on layers A1 and A2:

Both samples are slightly swollen by the phenolic disinfectant. They otherwise fulfill the specifications of Standard DIN EN 263; that is, none of the listed reagents left visible and relevant changes.

Example 5

Thermal shaping of the composites VS1 and VS2

The composites VS1 and VS2 in accordance with Examples 1 and 2 are heated to surface temperatures of 155° C. by infrared irradiation on both sides and are vacuum-shaped to bathtub-like molded articles. The composites can be thermally shaped very well. Fine shapings are also possible without repunching. The surface quality of the molded articles is excellent.

Obviously, additional modifications and variations of the present invention are possible in light of the above teachings. It is therefore to be understood that within the scope of the appended claims, the invention may be practiced otherwise than as specifically described herein.

This application is based on German Patent application P 4,436,381.8, filed with the German Patent Office on Oct. 12, 1994, the entire contents of which are hereby incorporated by reference.

What is claimed as new and desired to be secured by Letters Patent of the United States is:

1. A composite suitable for the production of articles, said composite comprising a layer A, said layer A having a non-laminated outer surface which comes into contact with water exhibiting temperatures between 0° and 90° C., said composite comprising:

i) layer A consisting essentially of a thermoplastic, impact-resistant polymethyl methacrylate plastic comprising a core-shell structure, having a Vicat softening temperature of at least 95° C. according to ISO 306 procedure B and a notch impact resistance of at least 3.0 kJm$^{-2}$, according to ISO 180 1A; and ii) layer C, an impact-resistant acrylonitrile styrene copolymer.

2. The composite of claim 1, further comprising a layer B, a thermoplastic polymethyl methacrylate plastic, located between layer A and layer C.

3. The composite of claim 1, further comprising a reinforcement layer D, made of a curable cast resin, formed on an exterior surface of layer C which is opposite to layer A.

4. The composite of claim 1, wherein said composite is produced by coextrusion of layer A and layer B.

5. The composite of claim 1, wherein a thickness of layer A is between 0.2 and 5 mm and a thickness of layer C is between 0.5 and 20 mm.

6. The composite of claim 2, wherein a thickness of layer A is between 0.2 and 5 mm; a thickness of layer B, is between 0.5 and 20 mm; and a thickness of layer C, is between 0.5 and 20 mm.

7. The composite of claim 2, wherein a thickness of layer A is between 0.5 and 3 mm; a thickness of layer B is between 1 and 10 mm; and a thickness of layer C, is between 1 and 10 mm.

8. The composite of claim 3, wherein a thickness of said reinforcement layer D is between 3 and 20 mm.

9. The composite of claim 1, wherein layer A further comprises 0.1 to 10 wt. %, based on polymer SP of an element selected from the group consisting of pigments, UV absorbers, pigments and a mixture thereof.

10. The composite of claim 3, wherein said reinforcement layer D further comprises 5 to 40 wt %, based on said curable cast resin, of a fillers selected from the group consisting of minerals or fibrous substances.

11. The composite of claim 3, wherein said curable cast resin is a polyurethane resin or a resin formed from fractions of styrene and unsaturated polyesters.

12. The composite of claim 1, wherein said impact-resistant acrylonitrile-styrene copolymer is an acrylonitrile-butadiene-styrene terpolymer.

13. The composite of claim 3, wherein said reinforcement layer D is foamed.

14. The composite of claim 1, wherein the impact-resistant polymethyl methacrylate plastic of layer A comprises:

i) 1–80 wt. % of an at least two-stage emulsion polymer; and ii) 20–99 wt. % of a polymethyl methacrylate plastic.

15. The composite of claim 14, wherein said at least two-stage emulsion polymer comprises:

i') a core of a crosslinked polyacrylate; and ii') an outer shell of a polymethyl methacrylate plastic.

16. The composite of claim 14, wherein said at least-two stage emulsion polymer has a particle diameter of from 0.1 to 3 µm.

17. The composite of claim 2, wherein said thermoplastic polymethyl methacrylate plastic is formed from a monomer mixture comprised of:

i) 80–100 wt. % of methyl methacrylate; and ii) 0 to 20 wt. % of a copolymerizable monomer selected from the group consisting of a $C_{1-4}$ alkyl acrylate, a vinyl aromatic and a mixture thereof.

18. A three-dimensionally shaped sanitary article, wherein said article is formed from a composite comprising:

i) layer A consisting essentially of a thermoplastic, impact-resistant polymethyl methacrylate plastic which comes into contact with water, comprising a core-shell structure having a Vicat softening temperature of at least 95° C. according to ISO 306 procedure B and a notch impact resistance of at least 3.0 $kJm^{-2}$, according to ISO 180 1A; and ii) layer C, an impact-resistant acrylonitrile styrene copolymer.

19. The three-dimensionally shaped sanitary article of claim 18, wherein said sanitary article has a concave surface and a corresponding convex surface wherein an exterior surface of said layer A is on said concave portion of said sanitary article which comes into contact with water.

* * * * *